United States Patent [19]

Luetzelschwab

[11] Patent Number: 4,603,154
[45] Date of Patent: * Jul. 29, 1986

[54] METHOD FOR PREPARING DILUTE POLYMER SOLUTIONS

[75] Inventor: Wayne E. Luetzelschwab, Littleton, Colo.

[73] Assignee: Marathon Oil Company, Findlay, Ohio

[*] Notice: The portion of the term of this patent subsequent to Mar. 18, 2003 has been disclaimed.

[21] Appl. No.: 746,438

[22] Filed: Jun. 19, 1985

Related U.S. Application Data

[63] Continuation-in-part of Ser. No. 699,759, Feb. 8, 1985, Pat. No. 4,576,978, which is a continuation-in-part of Ser. No. 466,737, Feb. 16, 1983, Pat. No. 4,508,858.

[51] Int. Cl.$^4$ .............................................. C08L 33/26
[52] U.S. Cl. .................................... 523/313; 523/318; 523/348; 524/555; 524/827; 525/329.4
[58] Field of Search ......................... 523/313, 318, 348; 524/555, 827; 525/329.4

[56] References Cited

U.S. PATENT DOCUMENTS

| | | | |
|---|---|---|---|
| 2,023,546 | 12/1935 | Pummill | 196/45 |
| 2,125,245 | 7/1938 | McCray | 259/4 |
| 2,820,777 | 1/1958 | Suen et al. | 526/89 |
| 3,807,701 | 4/1974 | Reid et al. | 259/4 |
| 4,021,394 | 5/1977 | Tuka et al. | 524/922 |
| 4,110,521 | 8/1978 | Barnett et al. | 526/88 |
| 4,274,749 | 6/1981 | Lake et al. | 366/132 |
| 4,402,916 | 9/1983 | Luetzelschwab | 422/256 |
| 4,439,334 | 3/1984 | Borchardt | 252/8.55 D |
| 4,508,858 | 4/1985 | Luetzelschwab | 523/313 |

Primary Examiner—Joseph L. Schofer
Assistant Examiner—N. Sarofim
Attorney, Agent, or Firm—Jack L. Hummel; Rodney F. Brown

[57] ABSTRACT

A method for preparing dilute aqueous polymer solutions, especially dilute aqueous partially hydrolyzed polyacrylamide solutions, for use in secondary and tertiary oil recovery processes. The method comprises producing a concentrated polymer solution in a polymerization reactor and diluting the resulting gel-like, relatively high concentration polymer solution to obtain a free-flowing, relatively low concentration polymer solution by means of a staged dilution process. In each stage, an aqueous diluent is combined with the polymer solution to produce a nonuniform mixture which is maintained in a vessel in a quiescent state until the mixture becomes uniform. The stages are repeated as many times as necessary until the free-flowing, relatively low concentration polymer solution is obtained.

30 Claims, 1 Drawing Figure

METHOD FOR PREPARING DILUTE POLYMER SOLUTIONS

DESCRIPTION

This is a continuation-in-part application of copending patent application Ser. No. 699,759 filed on Feb. 8, 1985, now U.S. Pat. No. 4,576,978, which is a continuation-in-part application of patent application Ser. No. 466,737 filed on Feb. 16, 1983 and issued as U.S. Pat. No. 4,508,858 on Apr. 2, 1985.

BACKGROUND OF THE INVENTION

1. Field of the Invention

The present invention relates to a method for preparing dilute polymer solutions and in particular to a method for preparing dilute aqueous polymer solutions of the type used in secondary and tertiary oil recovery processes.

2. Description of Related Art

Various apparatus and methods for preparing aqueous polymer solutions, including aqueous solutions of partially hydrolyzed polyacrylamides, have been proposed. U.S. Pat. No. 2,820,777 discloses a one-step batch method for simultaneously polymerizing and hydrolyzing acrylamide monomer in a single reaction vessel. Two solutions are pumped at an equal volume rate into the reactor. The first solution comprises acrylamide monomer and water and the other comprises a polymerization catalyst, an alkali metal hydroxide, and water. Although the properties of the polymer product may be a function of the proportional amount of reactants and the reaction conditions, as the patent suggests, it is virtually impossible to predictably produce a specific polymer using this batch method because of inherent process control difficulties. Therefore, the method is unsuitable for preparing aqueous polymer solutions used in secondary and tertiary oil recovery processes. Such processes require polymers having predictable properties to meet the performance demands of an oil-bearing formation.

U.S. Pat. No. 4,110,521 is directed to a method for the continuous preparation of aqueous polymer solutions. The method is relatively complex and costly because it requires a large number of static mixers, pumps and temperature controls. As a result, it is impractical and unsuitable for on-site preparation of aqueous polymer solutions used in secondary and tertiary oil recovery processes.

SUMMARY OF THE INVENTION

The method of the present invention is uniquely suited for the preparation of uniform dilute aqueous polymer solutions, which are used as drive fluids and/or mobility control buffers in secondary or tertiary oil recovery processes generally known as enhanced oil recovery processes. The present method of preparing the dilute polymer solution produces a dilute polymer solution having maximum effectiveness in meeting the performance demands of substantially any oil-bearing formation. The method can be performed using equipment which is inexpensive and easy to operate.

In the method of the present invention, a discrete volume or slug of a reaction mixture comprising an aqueous solution of a monomer and a polymerization initiator or catalyst is formed in a reaction mixture receiving means. The volume of reaction mixture is desirably maintained in the receiving means for a time sufficient to initiate polymerization. The volume of partially polymerized solution is then conveyed into a polymerization reactor means having inlet and outlet means. The volume of partially polymerized solution is passed through the polymerization reactor means at a rate such that when the volume of solution reaches the polymerization reactor outlet, it is essentially completely polymerized.

The completely polymerized solution is then conveyed from the polymerization reactor means to a post polymerization reactor means having inlet and outlet means. Enroute to the post polymerization reactor means one or more polymer modifying agents, such as a hydrolyzing agent, are added to and entrained in the completely polymerized solution stream. The resulting polymer solution, containing the modifying agent, is passed through the post polymerization reactor means at a rate to enable the modifying agent to completely convert the polymer to a desired product solution.

The above-recited series of steps are repeated several times to establish reaction gradients in both the polymerization reactor means and the post polymerization reactor means and to provide a continuous flow of aqueous polymer solution from the process. In the polymerization reactor means, the reaction gradient is represented by a plurality of discrete volumes or slugs of partially polymerized solution descending through the reactor means. The extent to which the polymerization reaction has progressed is uniform within each volume, but differs from volume to volume within the entire polymerization reactor means. There is no mixing between the volumes. Thus, the extent of reaction in a given volume in the reactor is greater than that of a volume entering the reactor after it, but less than that of a volume which has entered the reactor before it.

While the reaction gradient in the post polymerization reactor means is not as well defined as that in the polymerization reactor means, the extent of reaction is also a function of reactor location. Like the polymerization reactor means, the post polymerization reactor means is characterized in that the reaction will be just starting or progressing to only a minor extent at the inlet end of the reactor means, while the reaction will be progressing significantly toward completion in the region between the inlet and outlet ends of the reactor means. The reaction will be essentially complete at the outlet end of the reactor means. The progress of the reactions occurring in each of the reactor means can be monitored and the flow rates of the process streams can be readily controlled to assure that the end product from each reactor means has the desired properties.

The product solution of the post polymerization reactor means generally has too high of a polymer concentration for oil recovery applications. Therefore, the solution is diluted from a gel-like, highly viscous, relatively high concentration polymer solution to a free-flowing, relatively low concentration polymer solution suitable for oil recovery applications by means of a staged dilution process.

The staged dilution process comprises combining an aqueous diluent with the gel-like, high concentration polymer solution relatively quickly to produce a nonuniform mixture containing lumps of thick polymer gel within the aqueous diluent. This mixture is maintained in a holding or storage vessel in a quiescent state for an extended residence time until the mixture becomes a uniform solution, i.e., there are no detectable lumps.

This uniform solution is diluted further by repeating the same procedure as above in a second dilution stage. As many dilution stages as necessary are performed until the free-flowing, relatively low concentration polymer solution is obtained having a concentration suitable for its specific desired use.

The foregoing and other features and advantages of the invention will become more apparent from the description to follow, taken in conjunction with the accompanying drawing.

DESCRIPTION OF THE PREFERRED EMBODIMENTS

Figure 1:
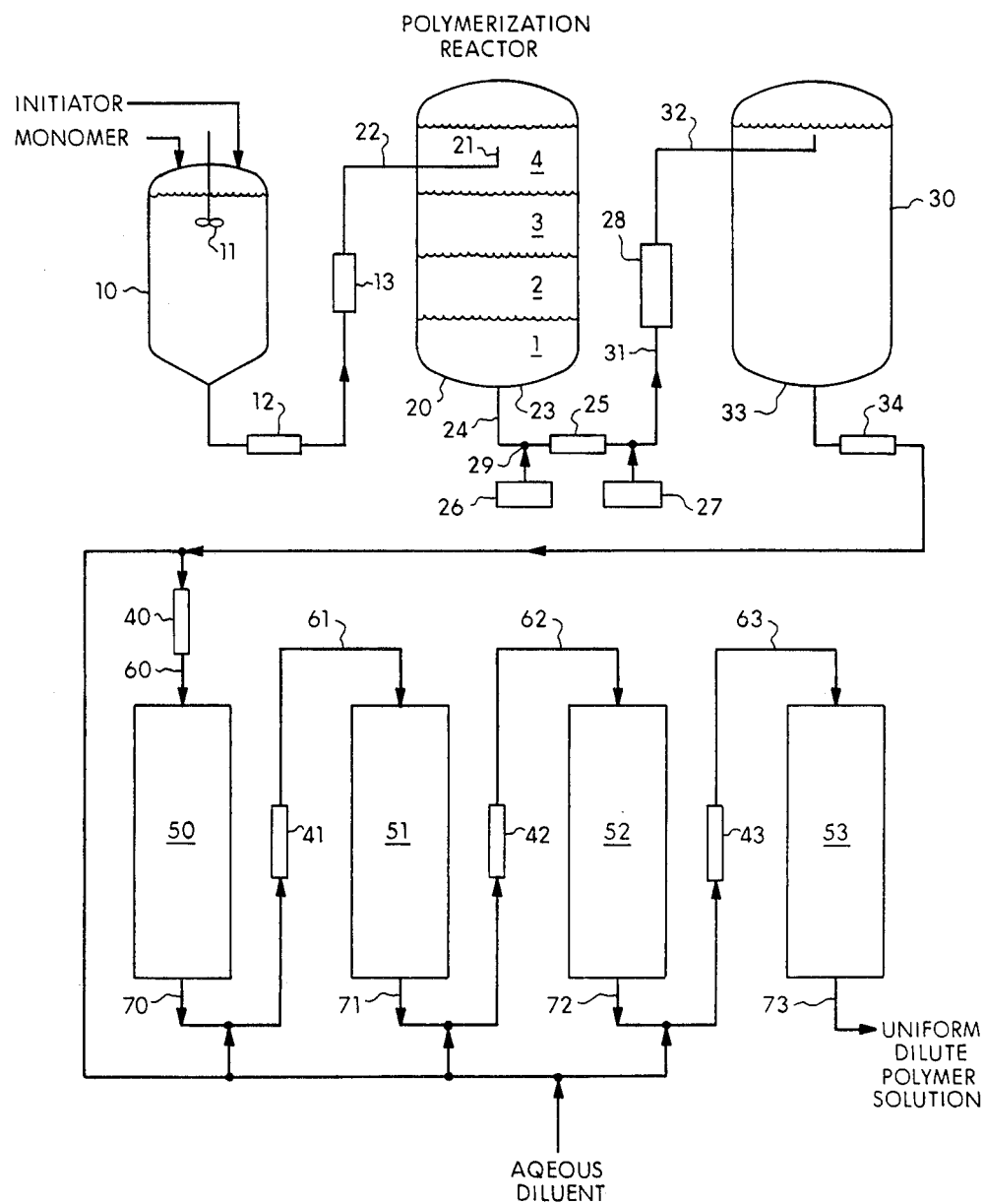
FIG. 1 is a schematic representation of the present invention.

To illustrate the method for preparing a uniform dilute aqueous solution of a partially hydrolyzed polyacrylamide of the type employed in secondary and tertiary oil recovery, specific reference is made to FIG. 1. For purposes of this illustration, the reaction mixture receiving vessel 10 has a capacity of approximately 5000 gallons. The reactors 20 and 30 each have a capacity of about 100,000 gallons. An aqueous monomer solution, comprising between about 3 to about 15% by weight acrylamide monomer, and a polymerization initiator are fed to the vessel 10. The vessel 10 desirably is sparged with nitrogen either before or after addition of the initiator to remove any oxygen therefrom.

A preferred initiator is a cocatalyst system comprising sodium bisulfite and ammonium persulfate. The sodium bisulfite is introduced into the vessel 62 first as an oxygen scavenger. Then ammonium persulfate is added. The concentration of the catalysts is about 180 ppm of the bisulfite and about 400 ppm of the persulfate based on the weight of monomer.

The resulting reaction mixture is stirred in the vessel 10 by stirrer 11. The reaction temperature ranges from about 100° F. to about 110° F. The residence time of the reaction mixture in the vessel 10 need only be long enough to insure initiation of the reaction, which is indicated by a slight rise in the temperature of the vessel 10. Generally the residence time in the vessel 10 is about 0.5 hours, although shorter times are possible and under some circumstances longer times may be necessary to insure that polymerization has initiated. Residence times in the vessel can be extended without unduly extending the time interval between feeds to the reactor 20 simply by using two or more vessels similar to vessel 10 operating in series. The partially polymerized solution is transferred at a rate of about 100 gallons per minute from vessel 10 by pump 12 to the polymerization reactor 20 via inlet 22. Although not essential, the solution may be passed through a heat exchanger 13 prior to entering the polymerization reactor 20, thereby adjusting the temperature of the reaction mixture as it enters the reactor 20 to about 90° F. Reactor 20 may also be sparged with nitrogen to maintain a substantially oxygen-free mixture.

After the vessel 10 has been emptied, a fresh volume of aqueous monomer solution and initiator is again introduced into the vessel 10 and processed in the same manner as above. The resulting volume of partially polymerized solution is then conveyed to the reactor 20 and added to its contents. The procedure is repeated until several volumes of partially polymerized solution are present in the reactor 20.

The volumes are conceptually illustrated in FIG. 1 by reference characters 1, 2, 3 and 4. Although for purposes of illustration, the reactor as shown contains only four volumes of solution having parallel horizontal interfaces, in practice, the reactor may contain many more volumes. Also internal effects such as laminar flow can distort the parallel interfaces between the volumes to irregular shapes. However, each volume maintains a distinct interface between adjacent volumes and substantially no mixing occurs between the volumes throughout their residence times in the reactor 76. These effects are achieved by sequentially adding the volumes to the reactor. The volumes of partially polymerized solutions are too viscous to mix simply by gravity and diffusion between volumes is insignificant during the residence times of interest.

The feed to the reactor 20 is performed in a manner which tends to distribute the volume across the internal cross-sectional area of the reactor 20. The viscosity of each volume of solution is such that this may be accomplished to some extent merely by discharging a volume from a single inlet orifice directed downward from the top of the reactor onto a volume of solution already present in the reactor. Distributors, such as a perforated plate or a plurality of perforated or slotted arms extending radially from a central inlet, can also be employed to provide greater distribution. The preferred method of feeding the partially polymerized solution to the reactor 76 is shown in FIG. 1 wherein the inlet line 22 is inserted into the sidewall of the reactor 20 and has an orifice 21 directed upward near the top of the tank which effectively distributes the incoming volume across the preceding one, minimizes penetration of the incoming volume into the preceding volume, and promotes the formation of a stable interface between the volumes. The preferred embodiment also avoids plugging problems which may occur in the other distributors listed above, having constricted flow paths.

Each volume has an average residence time in the reactor 20 of from about 20 to about 30 hours and preferably about 25 hours. As noted above, each volume in the reactor 20 has a different degree of polymerization at any given instant. For example, volume 2 in the reactor 20 of FIG. 1 is polymerized to a greater extent than volume 4 at any given instant. The height and flow rate of the reactor 20 are determined such that the polymerization reaction has gone substantially to completion in volume 1 when it reaches the reactor outlet 23. At that point, volume 1 is withdrawn from the reactor 20 via conduit 24 under the power of pump 25 at a flow rate of about 55 gallons per minute.

After withdrawing the completely polymerized solution from the reactor 20, a hydrolyzing agent from a source 27 is added to the solution before it enters the post polymerization reactor 30. In a preferred method, a hydrolysis static mixer 28 is located in line 31 downstream of the point where the hydrolyzing agent is added to the solution, but upstream of the post polymerization reactor 30 to ensure complete contacting of the polymer and hydrolyzing agent.

Intermediate dilution of the polymer solution with water from a source 26 may optionally be performed prior to or during static mixing. Dilution at this point reduces the pressure drop across the hydrolysis static mixer and provides ease in handling of the solution in the post polymerization reactor and any subsequent treatment without any substantial deleterious effects to the hydrolysis reaction. Furthermore, the dilution at this point enables one to prepare polymer solutions of greater concentration in reactor 20 than could otherwise be prepared due to pumping limitations. In the most preferred method, water is added to the polymer solution at point 29 upstream of the pump 25. In addition to the above-recited advantages, dilution at a point before the pump suction substantially reduces the load on pump 25.

The amount of dilution water which may be added to the polymer solution is limited to an amount less than that which would cause the resulting mixture to settle out into two discrete phases when the mixture is maintained in the post polymerization reactor 30 after passing through the static mixer. That is to say, the amount of dilution water added to the polymer solution cannot be so great that it causes a gel-like concentrated polymer phase to settle toward the bottom of reactor 30 and an aqueous diluent phase to migrate toward the top of the reactor 30. The "aqueous diluent" as defined herein is not limited to just water, but may contain some polymer dissolved therein. In any case, the aqeuous diluent is very thin and has a polymer concentration considerably less than the concentrated polymer solution.

The maximum amount of water which may be added to the polymer solution subject to the above-stated limitation is a function of the polymer concentration in the solution and the configuration of the static mixer. The volume of water added to the polymer solution is expressed herein as the volumetric fraction:

$$\frac{\text{polymer solution}}{\text{polymer solution + dilution water}}$$

wherein "polymer solution" is the volume of polymer solution before dilution and "dilution water" is the volume of dilution water which is added to the polymer solution. Generally the minimum value of the fraction is about 0.5 for a solution containing from about 3 to about 15% by weight polymer. However, in usual operation the fraction is maintained around 0.67 to insure that substantially no settling occurs. Any water may be added, which is compatible with the hydrolyzing agent, i.e., does not contain constituents which react with the hydrolyzing agent. The preferred dilution water is fresh water. If a brine is to be used in the ultimate subsequent staged dilution of the polymer solution for an oil recovery application, a salt, such as NaCl, may be added to the dilution water of the present invention to improve the solubility of the dilute polymer solution in the brine.

The amount of hydroxide added to the polymer solution is preferably sufficient to hydrolyze approximately 20% to about 40% of the amide groups comprising the polymer. The preferred hydrolyzing agent is a 50% sodium hydroxide solution, although more dilute sodium hydroxide solutions may be used which further dilute the polymer solution.

After adding hydrolyzing agent, the solution is continuously fed into the post polymerization reactor 30 via inlet line 32 in a manner which minimizes its penetration into the fluid already in the reactor. As a result, the extent of the hydrolysis reaction within the reactor varies continuously as a function of reactor location. When the hydrolysis reaction is complete, i.e., 20–40% hydrolysis, the partially hydrolyzed polymer solution is withdrawn from the outlet 33 of the reactor 30 at a rate of about 55 gallons per minute by a pump 34.

In most cases, the partially hydrolyzed polymer solution withdrawn from the post polymerization reactor outlet 33 is still too concentrated for oil recovery applications, even if intermediate dilution of the polymer solution prior to hydrolysis is employed, because the polymer solution exhibits gel-like characteristics. By definition, the gel-like solution has considerable resistance to flow and forms a relatively stable interface when contacted with an aqeuous diluent, which makes dilution difficult. Generally, the polymer concentration of the partially hydrolyzed polymer solution at outlet 33 is relatively high, i.e., greater than about 3% by weight (wt%), and the solution is gel-like.

Dilution of the concentrated polymer solution is accomplished by first mixing the solution with an aqueous diluent, such as fresh water or a brine. Mixing is accomplished by any means which does not substantially degrade the polymer by reducing its molecular weight.

In the preferred embodiment, the polymer solution and diluent are mixed in the first dilution stage 60 by simultaneously introducing them into a dilution static mixer 40. They are subsequently discharged from the mixer as a nonuniform mixture. The nonuniform mixture is "nonuniform" to the extent that it contains two distinct phases: (1) lumps or globules of concentrated, gel-like polymer solution; and (2) aqueous diluent, also known as free water, which may contain a small amount of polymer in solution. However, these two phases may be dispersed throughout the nonuniform mixture such that the lumps are suspended in the diluent or free water and do not settle upon standing.

The nonuniform mixture is introduced into a holding tank or dilution vessel 50 where it is maintained in a quiescent state. The mixture is maintained in the vessel for a residence time sufficient to obtain a uniform dilute aqueous polymer solution at a lower polymer concentration than the concentration of the high concentration polymer solution fed to the static mixer. The uniform solution is "uniform" to the extent that it contains only a single phase, i.e., a polymer solution at one concentration, and contains substantially no detectable lumps. It is believed that uniformity is achieved by diffusion of the aqueous diluent into the lumps causing the interfaces to disappear.

The residence time is a function of the relative volume of diluent added to the polymer solution and the size of the lumps of polymer gel in the nonuniform mixture. Virtually any volumetric fraction is possible in the practice of the present invention. However, the volumetric fraction preferably should be subject to the same limitations as those described above for the intermediate dilution step. A volumetric fraction below 0.5 is not preferred because it generally causes the lumps in the nonuniform mixture to settle to the bottom of the holding tank while the mixture is quiescent, rather than remaining suspended and dispersed throughout the dilute polymer solution until the mixture becomes uniform. Although it is possible to practice the present invention with settling of the lumps, the condition is preferably avoided by raising the volumetric fraction. Settling is undesirable because it requires impractically long residence times to obtain the uniform solution. Once the solution is uniform, it is withdrawn from the holding tank via line 70 completing the first dilution stage 60.

The dilution stage may be repeated any number of times until a polymer solution is obtained which is at a predetermined lower polymer concentration. Generally this is a concentration where the polymer solution no longer forms a relatively stable interface upon contact with the aqueous diluent or where the solution is at a concentration suitable for its specific application. Multiple dilution stages 60, 61, 62, 63, as shown in FIG. 1, are achieved by linking the requisite static mixers 40, 41, 42, 43 and holding tanks 50, 51, 52, 53 in series via fluid pipelines 70, 71, 72, 73.

Performance of the optional intermediate dilution step, diluting the unhydrolyzed polymer solution prior to hydrolysis, may also be considered a dilution stage. The intermediate dilution step is equivalent to one of the multiple stages described above, albeit at a different point in the process than the multiple dilution stages, because many of the limitations for the intermediate dilution step are equivalent to those for the multiple dilution stages. For example, in all cases the diluent is added to the concentrated polymer solution in a specified amount such that settling of gel-like material preferably does not occur in the holding tank and the mixture is maintained in the tank until uniformity of the resulting less-concentrated solution is achieved.

The point at which the polymer solution is no longer gel-like, i.e., no longer maintains a relatively stable interface with an aqueous diluent after static mixing, is in a range from about 1.5 to about 4.0 wt% depending on the character of the diluent and the molecular weight of the polymer. Once the polymer solution is diluted to within this range, it can be further diluted by any conventional means or by continuing the dilution stages in accordance with the instant invention. It is important to note that when diluting a lower concentration, nongel-like polymer solution, the volumetric ratio of diluent to polymer solution can be increased because the capacity of the polymer solution for dilution is greater. The ultimate or final dilution range wherein the polymer solution is useful for oil recovery applications as a polymer flooding drive fluid or a mobility buffer is around 50 ppm to about 4.0 wt%.

Although the staged dilution process is described above in combination with a specific polymer manufacturing process, the staged dilution process can be employed with virtually any polymer manufacturing process wherein a gel-like concentrated polymer solution is produced. It is only necessary to add the requisite tank or tanks, static mixers and piping at the end of the manufacturing process. The dilution process is especially suited for use with a polymer manufacturing process having excess product storage capacity. Preexisting product storage tanks can be utilized in the present process simply by linking the tanks in series and equipping the fluid piping with the necessary static mixers and dilution water feed lines.

In some cases, it is necessary to produce the polymer solution at a location remote from an injection site of an oil recovery process, which requires transporting the polymer solution to the injection site by tank truck, rail car or the like. The present process can be utilized to dilute the concentrated polymer solution in one or more stages to a lesser concentration, but still greater than the final dilute concentration required for use in the oil recovery process. The final dilution stage can then be carried out at the injection site.

This embodiment enables easier handling of the polymer solution during transit by providing a less viscous solution than the undiluted solution as produced, yet the product solution is not made so dilute as to increase its volume beyond that which would be practical for transportation to the dilution site. The embodiment has the further advantage of being able to utilize the residence time of the transport tank during transit to achieve uniformity of the nonuniform polymer solution. Thus, a nonuniform solution can be loaded into a tank for transport, e.g., a tank truck, and, if the transit time is sufficient, the solution will be uniform upon arrival at the injection site. If the transit time is not sufficient to achieve uniformity, a storage tank at the injection site can be utilized for an additional time until the solution is uniform.

The following examples are presented by way of illustration and are not to be construed as limiting the scope of the invention.

EXAMPLE 1

A concentrated polyacrylamide solution, having a polymer concentration of 9.0 wt%, is prepared by polymerizing a 9.0 wt% monomer solution using ammonium persulfate initiator in polymerization reactor 20. An intermediate dilution water in a volumetric ratio of 1:2, diluent to polymer solution, and a hydrolyzing agent are added to the polymer solution prior to hydrolysis and upstream of the hydrolysis static mixer. The polymer solution is fed to the static mixer 28 at a rate of 60 gpm and the diluent at 30 gpm.

The polymer solution thereafter hydrolyzes in reactor 30 to produce a concentrated partially hydrolyzed polyacrylamide (PHPA) solution, having a polymer concentration of 6.5 wt%. The PHPA solution from reactor 30 is fed into a dilution static mixer at a rate of 90 gpm along with a brine diluent at a rate of 45 gpm.

The resulting nonuniform mixture is fed into an 80,000 gallon storage tank where it is maintained in a quiescent state until it becomes a uniform solution having a PHPA concentration of 5 wt%. The residence time in the storage tank is about 15 hours. The 5 wt% solution is transferred from the storage tank to a tank truck and trucked to an injection well head where it is diluted on-site by repeating the dilution process above to a PHPA concentration of 1000 ppm suitable for use in an oil recovery process.

EXAMPLE 2

A concentrated polyacrylamide solution, having a polymer concentration of 9.0 wt%, is prepared in the manner of Example 1. The polymer solution is hydrolyzed without intermediate dilution producing a concentrated PHPA solution, having a PHPA concentration of 9.8 wt%.

At the first stage in a series of several dilution stages, the 9.8 wt% PHPA solution is fed at a rate of 60 gpm into the dilution static mixer as shown in FIG. 1. A reservoir brine is simultaneously fed to the static mixer at a rate of 30 gpm to obtain a nonuniform 6.5 wt% PHPA solution. The nonuniform solution is maintained in an 80,000 gallon storage tank until it becomes a uniform 6.5 wt% PHPA solution, which requires a residence time of about 15 hours.

Upon completion of the first dilution stage, the uniform 6.5 wt% PHPA is fed at a rate of 90 gpm into the dilution static mixer of the second stage with additional reservoir brine at a rate of 45 gpm to obtain a nonuniform 4.2 wt% PHPA solution. The nonuniform 4.2 wt% solution is maintained in the storage tank of the second stage until it becomes uniform, which requires a residence time of about 15 hours. The uniform 4.2 wt% PHPA solution is diluted in a similar manner in the third stage to a uniform 2.8 wt% PHPA solution and again in the fourth stage from 2.8 wt% to 1.9 wt%. The uniform 1.9 wt% PHPA solution is diluted to a uniform dilute 500 ppm PHPA solution at an injection well head by simple static mixing in the flow line.

While the foregoing embodiments of the invention have been described and shown, it is understood that alternatives and modifications, such as those suggested and others may be made thereto and fall within the scope of the invention.

I claim:

1. A process for preparing a uniform dilute aqueous polymer solution used in enhanced oil recovery from a subterranean oil-bearing formation comprising:

forming a slug of a polymerization mixture comprising a polymerizable substance and a polymerization initiator;

introducing the slug into a polymerization vessel having an inlet and an outlet;

repeating the formation of additional slugs of the polymerization mixture and sequentially introducing each additional slug into the polymerization vessel to form a reaction gradient between the slugs such that substantially no mixing occurs between each slug;

controlling the rate of continuous movement of each slug in the polymerization vessel from the inlet to the outlet so that each slug is essentially completely polymerized to a polymer slug at the outlet;

successively and continuously removing each polymer slug from the outlet;

forming a reaction mixture by continuously introducing into each polymer slug a modifying agent capable of reacting with the polymer;

continuously introducing the reaction mixture into a reaction vessel having an inlet and an outlet;

controlling the rate of continuous movement of the reaction mixture in the reaction vessel from the inlet to the outlet such that the reaction between the polymer and the modifying agent is essentially complete at the outlet, forming a concentrated product solution;

continuously removing the concentrated product solution from the outlet of the reaction vessel;

mixing the concentrated product solution with an aqueous diluent without substantially degrading the polymer to obtain a nonuniform mixture of the concentrated product solution and aqueous diluent;

introducing the nonuniform mixture into a dilution vessel; and maintaining the nonuniform mixture in the dilution vessel for a time sufficient to convert the nonuniform mixture to a uniform dilute polymer solution having a lower polymer concentration than the concentrated product solution.

2. The process of claim 1 additionally comprising a dilution stage of:

mixing the uniform dilute polymer solution and aqueous diluent without substantially degrading the polymer to obtain a second nonuniform mixture;

introducing the second nonuniform mixture into a second dilution vessel; and maintaining the second nonuniform mixture in the second dilution vessel for a time sufficient to convert the second nonuniform mixture to a uniform second dilute polymer solution having a lower polymer concentration than the first uniform dilute polymer solution.

3. The process additionally comprising repeating the dilution stage of claim 2 one or more times to obtain a final uniform dilute polymer solution having a lower polymer concentration than the dilute polymer solution of the immediately preceding stage.

4. The process of claim 1 wherein the polymer concentration of the concentrated product solution is from about 3.0 to about 15.0 percent by weight.

5. The process of claim 1 wherein the polymer concentration of the dilute polymer solution is from about 2.0 to about 12.0 percent by weight.

6. The process of claim 2 wherein the concentration of the second dilute polymer solution is from about 1.4 to about 9.0 percent by weight.

7. The process of claim 3 wherein the final dilute polymer solution is sufficiently miscible in the aqueous diluent upon contact so as not to form a stable interface upon contact.

8. The process of claim 3 wherein the concentration of the final dilute polymer solution is less than about 4.0 percent by weight.

9. The process of claim 1 wherein the concentrated polymer solution and aqueous diluent are mixed in a static mixer.

10. The process of claim 2 wherein the second dilution vessel is used to transport the second nonuniform mixture to a location remote from the first dilution vessel.

11. The process of claim 1 wherein the aqueous diluent is a fresh water.

12. The process of claim 1 wherein the aqueous diluent is a brine.

13. The process of claim 1 wherein the concentrated product solution is dispersed as discrete lumps throughout the aqueous diluent in the nonuniform mixture.

14. A process for dilution of a concentrated polymer solution having a gel-like consistency to a dilute aqueous polymer solution having a lower concentration than the concentrated polymer solution comprising:

mixing the concentrated polymer solution with an aqueous diluent without substantially degrading the polymer to obtain a nonuniform mixture of the concentrated polymer solution and aqueous diluent;

introducing the nonuniform mixture into a dilution vessel; and maintaining the nonuniform mixture in the dilution vessel for a time sufficient to convert the nonuniform mixture to a uniform dilute polymer solution having a lower polymer concentration than the concentrated polymer solution.

15. The process of claim 14 additionally comprising a second dilution stage of:

mixing the uniform dilute polymer solution and aqueous diluent without substantially degrading the polymer to obtain a second nonuniform mixture;

introducing the second nonuniform mixture into a second dilution vessel; and maintaining the second nonuniform mixture in the second dilution vessel for a time sufficient to convert the second nonuniform mixture to a uniform second dilute polymer solution having a lower polymer concentration than the first uniform dilute polymer solution.

16. The process of claim 15 additionally comprising repeating the dilution stage one or more times to obtain a final uniform dilute polymer solution having a lower polymer concentration than the dilute polymer solution of the immediately preceding stage.

17. The process of claim 14 wherein the polymer concentration of the concentrated product solution is from about 3.0 to about 15.0 percent by weight.

18. The process of claim 14 wherein the polymer concentration of the dilute polymer solution is from about 2.0 to about 12.0 percent by weight.

19. The process of claim 15 wherein the concentration of the second dilute polymer solution is from about 1.4 to about 9.0 percent by weight.

20. The process of claim 16 wherein the final dilute polymer solution is sufficiently miscible in the aqueous diluent not to form a stable interface upon contact with the aqueous diluent.

21. The process of claim 16 wherein the concentration of the final dilute polymer solution is less than about 4.0 percent by weight.

22. The process of claim 14 wherein the concentrated polymer solution and aqueous diluent are mixed in a static mixer.

23. The process of claim 15 wherein the second dilution vessel is used to transport the second nonuniform mixture to a location remote from the first dilution vessel.

24. The process of claim 14 wherein the aqueous diluent is a fresh water.

25. The process of claim 14 wherein the aqueous diluent is a brine.

26. The process of claim 14 wherein the concentrated product solution is dispersed as discrete lumps throughout the aqueous diluent in the nonuniform mixture.

27. The process of claim 1 wherein the polymerizable substance is an acrylamide monomer.

28. The process of claim 1 wherein the polymerizable substance is an acrylamide monomer and the modifying agent is an alkali metal hydroxide.

29. The process of claim 28 wherein the concentrated product solution comprises partially hydrolyzed polyacrylamide.

30. The process of claim 14 wherein the concentrated product solution comprises partially hydrolyzed polyacrylamide.

* * * * *

UNITED STATES PATENT AND TRADEMARK OFFICE
CERTIFICATE OF CORRECTION

PATENT NO. : 4,603,154

DATED : July 29, 1986

INVENTOR(S) : Wayne E. Luetzelschwab

It is certified that error appears in the above-identified patent and that said Letters Patent is hereby corrected as shown below: Title page:

Page 1, Item [*]: Delete "Notice: The portion of the term of this patent subsequent to Mar. 18, 2003 has been disclaimed." and insert --Notice: The portion of the term of this patent subsequent to Apr. 2, 2002 has been disclaimed.--.

Signed and Sealed this

Thirteenth Day of December, 1988

Attest:

DONALD J. QUIGG

Attesting Officer

Commissioner of Patents and Trademarks